US00RE47994E

(19) United States
(12) Reissued Patent
Bowen et al.

(10) Patent Number: US RE47,994 E
(45) Date of Reissued Patent: May 19, 2020

(54) CHARGING DEVICE FOR ELECTRONIC VAPORIZATION DEVICE

(71) Applicant: JUUL Labs, Inc., San Francisco, CA (US)

(72) Inventors: Adam Bowen, San Francisco, CA (US); James Monsees, San Francisco, CA (US); Steven Christensen, San Francisco, CA (US)

(73) Assignee: JUUL Labs, Inc., San Francisco, CA (US)

(21) Appl. No.: 29/628,194

(22) Filed: Dec. 1, 2017

Related U.S. Patent Documents

Reissue of:
(64) Patent No.: Des. 744,419
Issued: Dec. 1, 2015
Appl. No.: 29/499,025
Filed: Aug. 11, 2014

(51) LOC (12) Cl. ..... 13-02
(52) U.S. Cl.
USPC ..... D13/108; D27/194
(58) Field of Classification Search
USPC ..... D13/107–110, 118–119, 182, 199; D14/251, 253, 432, 434; D27/172, 193, D27/194
CPC ..... Y02E 60/12; Y02E 90/14; Y02E 90/122; Y02E 90/128; Y02E 90/163; H02J 7/025; H02J 7/0042; H02J 7/0044; H02J 7/0045; H02J 7/0003; H01F 38/14; H01R 13/6675; H01M 2/1022; H01M 2/1055; H01M 10/44;

(Continued)

(56) References Cited

U.S. PATENT DOCUMENTS 576,653 A 2/1897 Bowlby
969,076 A 8/1910 Pender
(Continued)

FOREIGN PATENT DOCUMENTS

CN 201408820 Y 2/2010
CN 202004499 U 10/2011
(Continued)

*Primary Examiner* — Darlington Ly
(74) *Attorney, Agent, or Firm* — Mintz Levin Cohn Ferris Glovsky and Popeo, P.C.

(57) CLAIM

The ornamental design for a charging device for electronic vaporization device, as shown and described.

DESCRIPTION

*This application is an application for reissue of U.S. Pat. No. D. 744,419, issued on Dec. 1, 2015, which corresponds to U.S. patent application Ser. No. 29/499,025, the entire contents of which are incorporated herein by reference.*
FIG. 1 is a perspective view of a charging device for electronic vaporization device, showing our new design;
FIG. 2 is a top plan view thereof;
FIG. 3 is a left side elevation view thereof;
FIG. 4 is a rear elevation view thereof;
FIG. 5 is a right side elevation view thereof;
FIG. 6 is a front elevation view thereof; and,
FIG. 7 is a bottom plan view thereof.
[The broken lines shown in the drawings are included for the purpose of illustrating environmental structure and form no part of the claimed design.]
*The broken lines illustrate portions of the charging device for electronic vaporization device that form no part of the claimed design.*

1 Claim, 7 Drawing Sheets

Matter enclosed in heavy brackets [ ] appears in the original patent but forms no part of this reissue; matter printed in italics indicates the additions made by reissue.

(AMENDED)

(58) Field of Classification Search
CPC .. H01M 10/46; H01M 10/425; B60L 11/182; A24F 47/008
See application file for complete search history.

(56) References Cited

U.S. PATENT DOCUMENTS

| | | | | |
|---|---|---|---|---|
| 1,505,748 | A | 8/1924 | Louis | |
| 2,199,885 | A | 5/1940 | Kravchuk | |
| 2,459,656 | A | 1/1949 | Jack | |
| 2,676,237 | A | 4/1954 | Tooker, Jr. | |
| 4,241,742 | A | 12/1980 | Hilding | |
| D292,437 | S | 10/1987 | Wind, III | |
| 4,990,939 | A | 2/1991 | Sekiya et al. | |
| 5,529,078 | A | 6/1996 | Rehder et al. | |
| 5,843,014 | A | 12/1998 | Lattin et al. | |
| D405,007 | S | 2/1999 | Naas, Sr. | |
| 5,878,752 | A | 3/1999 | Adams et al. | |
| 5,967,310 | A | 10/1999 | Hill | |
| 6,269,966 | B1 | 8/2001 | Pallo et al. | |
| D458,409 | S | 6/2002 | Najar et al. | |
| 6,743,030 | B2 | 6/2004 | Lin et al. | |
| D498,328 | S | 11/2004 | Harel | |
| D500,302 | S | 12/2004 | Deguchi | |
| 6,909,840 | B2 | 6/2005 | Harwig et al. | |
| D514,741 | S | 2/2006 | Cohen Harel | |
| 7,019,491 | B2 | 3/2006 | Bozzone et al. | |
| D521,445 | S | 5/2006 | Liu | |
| D529,044 | S | 9/2006 | Andre et al. | |
| D532,776 | S | 11/2006 | Griffin | |
| 7,214,075 | B2 | 5/2007 | He et al. | |
| 7,275,941 | B1 | 10/2007 | Bushby | |
| D557,209 | S * | 12/2007 | Ahlgren et al. | D13/108 |
| D576,619 | S | 9/2008 | Udagawa et al. | |
| D577,019 | S | 9/2008 | Udagawa et al. | |
| D579,934 | S | 11/2008 | Okamoto et al. | |
| D591,758 | S | 5/2009 | Lee | |
| D610,588 | S | 2/2010 | Chen | |
| D611,409 | S * | 3/2010 | Green et al. | D13/110 |
| 7,753,055 | B2 | 7/2010 | Bryman | |
| D624,012 | S | 9/2010 | de Medeiros et al. | |
| D631,055 | S | 1/2011 | Gilbert et al. | |
| D631,883 | S | 2/2011 | Maier | |
| 7,905,236 | B2 | 3/2011 | Bryman et al. | |
| 7,931,149 | B2 | 4/2011 | Gilad et al. | |
| D638,430 | S | 5/2011 | Lee et al. | |
| D639,303 | S | 6/2011 | Ni et al. | |
| D648,726 | S | 11/2011 | Behar et al. | |
| D649,932 | S * | 12/2011 | Symons | D13/108 |
| 8,170,623 | B2 | 5/2012 | Dorogusker et al. | |
| D674,748 | S * | 1/2013 | Ferber et al. | D13/108 |
| D682,841 | S | 5/2013 | Suetake et al. | |
| D686,987 | S * | 7/2013 | Vanstone et al. | D13/108 |
| D687,042 | S | 7/2013 | Yoneta et al. | |
| D692,615 | S | 10/2013 | Verleur | |
| D697,029 | S | 1/2014 | Chiu | |
| D700,572 | S * | 3/2014 | Esses | D13/108 |
| D703,680 | S | 4/2014 | Lin | |
| D704,629 | S * | 5/2014 | Liu | D13/108 |
| D704,634 | S * | 5/2014 | Eidelman et al. | D13/108 |
| 8,881,738 | B2 | 11/2014 | Bryman | |
| D725,124 | S | 3/2015 | Lin et al. | |
| 9,032,968 | B2 | 5/2015 | Glasberg et al. | |
| 9,066,543 | B2 | 6/2015 | Cameron | |
| 9,167,849 | B2 | 10/2015 | Adamic | |
| D749,510 | S | 2/2016 | Liu | |
| D773,115 | S * | 11/2016 | Liu | D27/167 |
| D776,338 | S * | 1/2017 | Lomeli | D27/163 |
| D792,957 | S * | 7/2017 | Starkenburg | D23/363 |
| 9,717,277 | B2 | 8/2017 | Mironov | |
| 9,775,380 | B2 | 10/2017 | Fernando et al. | |
| 10,045,568 | B2 | 8/2018 | Monsees et al. | |
| 2005/0029137 | A1 | 2/2005 | Wang | |
| 2006/0288169 | A1 | 12/2006 | Steiner | |
| 2007/0191756 | A1 | 8/2007 | Tapper | |
| 2007/0229025 | A1 | 10/2007 | Tsai et al. | |
| 2009/0283103 | A1 | 11/2009 | Nielsen et al. | |
| 2009/0293892 | A1 | 12/2009 | Williams et al. | |
| 2010/0301032 | A1 | 12/2010 | Johnson | |
| 2010/0307116 | A1 | 12/2010 | Fisher | |
| 2011/0236002 | A1 | 9/2011 | Oglesby et al. | |
| 2012/0086391 | A1 | 4/2012 | Smith | |
| 2012/0188687 | A1 | 7/2012 | Yamamoto | |
| 2012/0223673 | A1 | 9/2012 | Chen et al. | |
| 2012/0325227 | A1 | 12/2012 | Robinson et al. | |
| 2013/0062335 | A1 | 3/2013 | Davis, Jr. | |
| 2013/0220847 | A1 | 8/2013 | Fisher et al. | |
| 2014/0014124 | A1 * | 1/2014 | Glasberg et al. | A24F 47/008 131/328 |
| 2014/0021190 | A1 | 1/2014 | Sardar | |
| 2015/0108019 | A1 | 4/2015 | Liu | |
| 2015/0114410 | A1 | 4/2015 | Doster | |
| 2015/0128967 | A1 | 5/2015 | Robinson et al. | |
| 2015/0167976 | A1 | 6/2015 | Recio | |
| 2016/0021771 | A1 | 1/2016 | Zhang et al. | |
| 2016/0167846 | A1 | 6/2016 | Zahr et al. | |
| 2017/0144827 | A1 | 5/2017 | Batista | |
| 2017/0164657 | A1 | 6/2017 | Batista | |
| 2017/0229888 | A1 | 8/2017 | Liu | |

FOREIGN PATENT DOCUMENTS

| | | |
|---|---|---|
| CN | 203182012 U | 9/2013 |
| JP | 2001165437 A | 6/2001 |

* cited by examiner

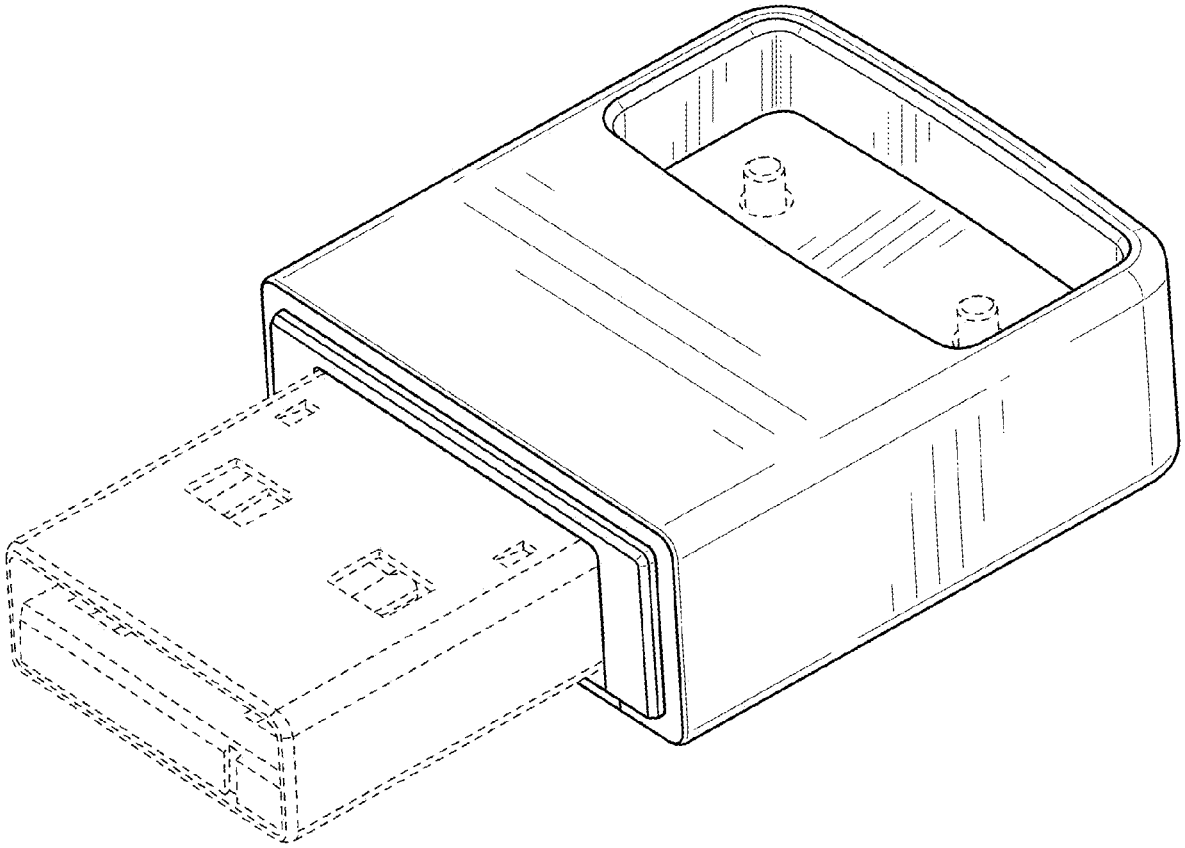
FIG. 1 (AMENDED)

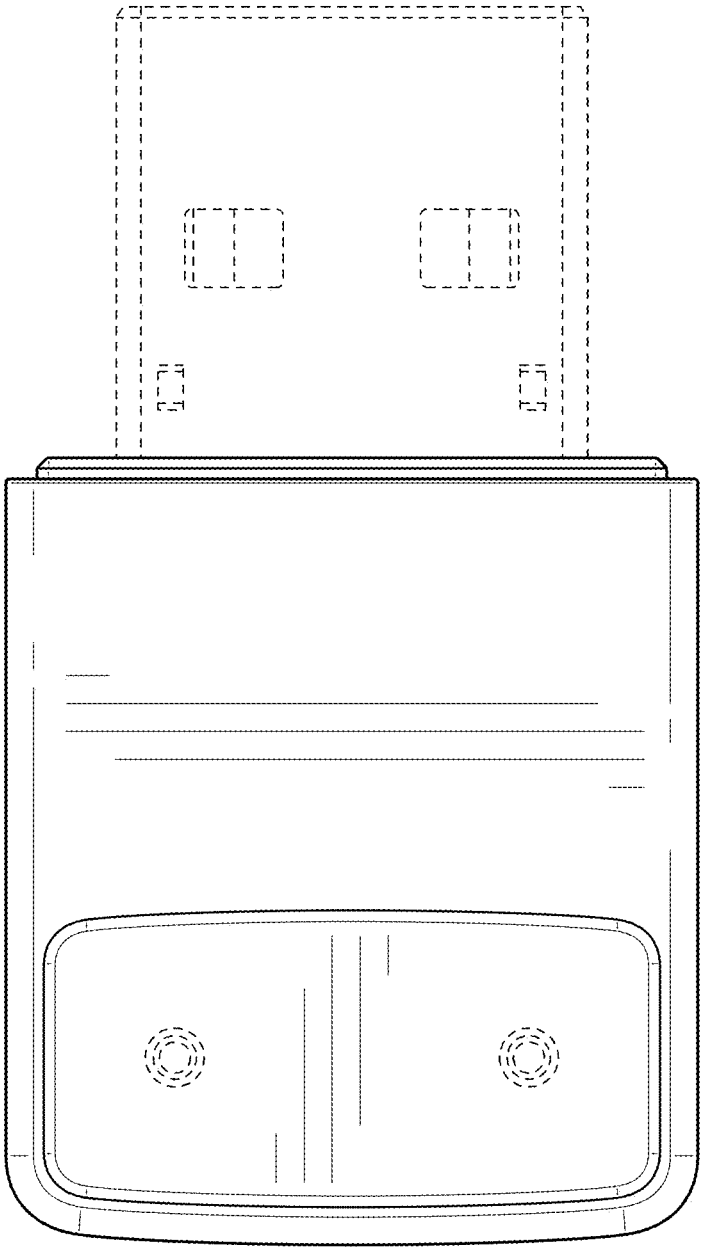
FIG. 2 (AMENDED)

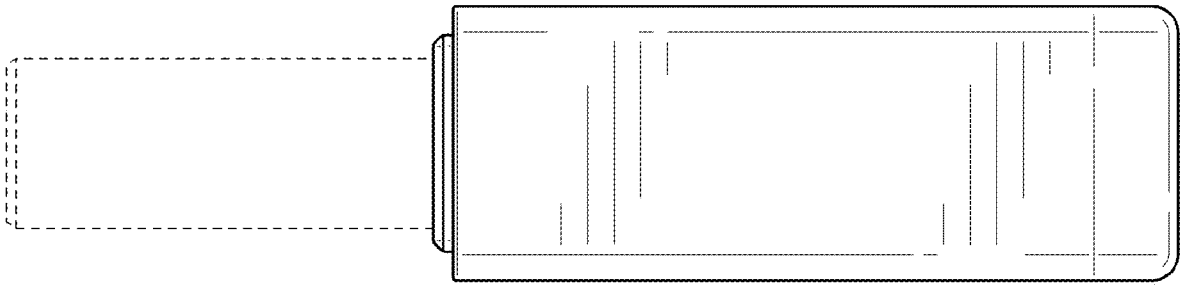
FIG. 3 (AMENDED)

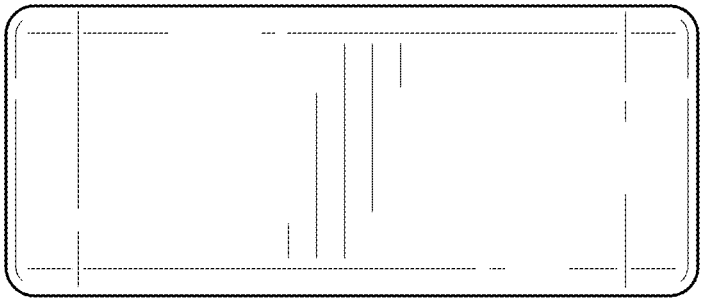
FIG. 4 (AMENDED)

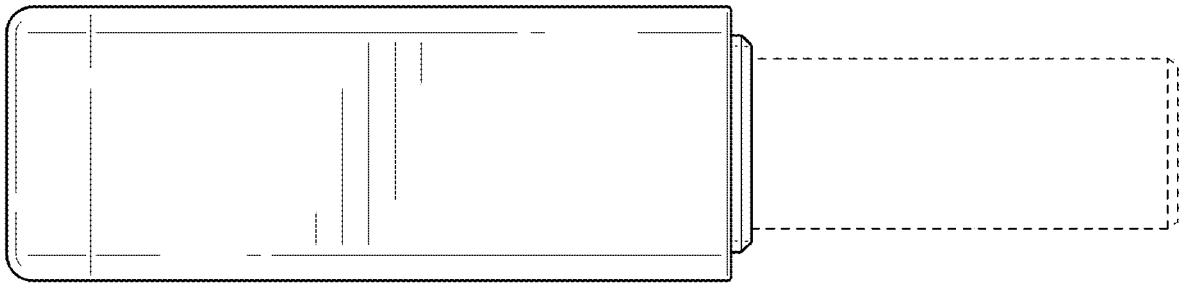
FIG. 5 (AMENDED)

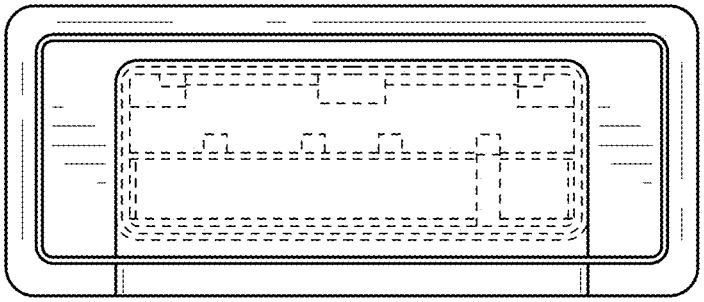
FIG. 6 (AMENDED)

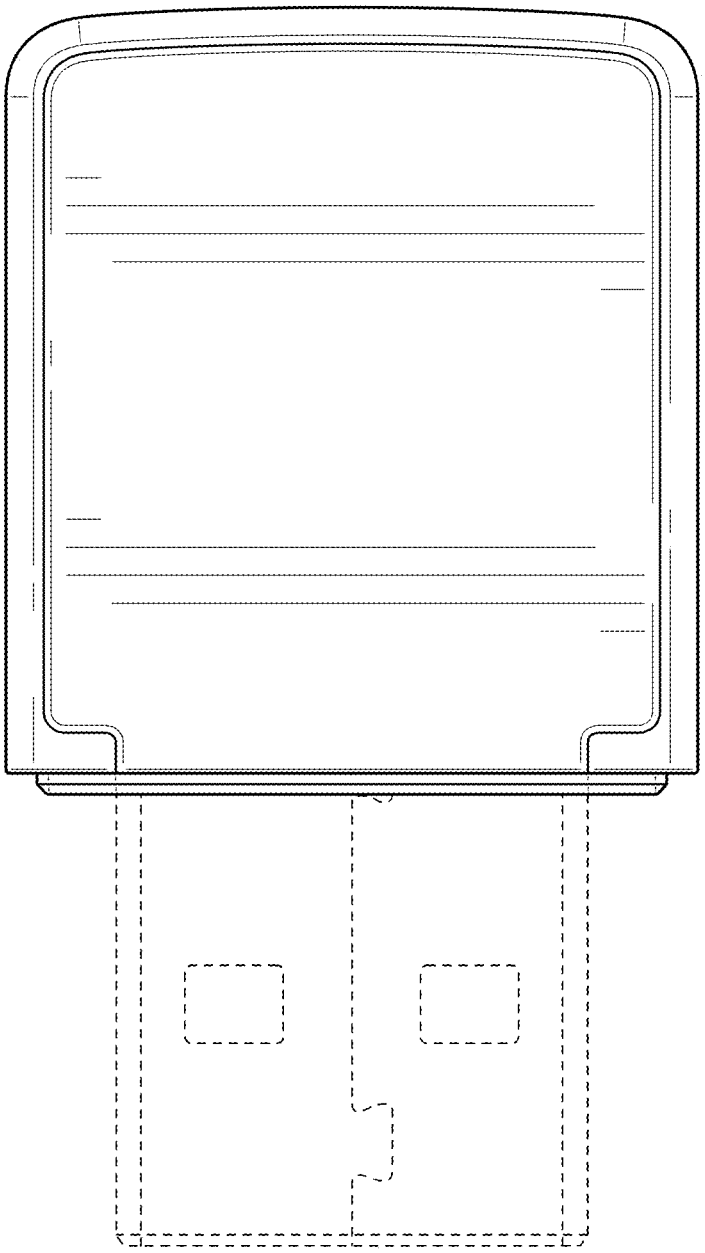
FIG. 7 (AMENDED)